Jan. 5, 1932. H. WHITE 1,839,284
WELL SCREEN
Filed Sept. 4, 1926
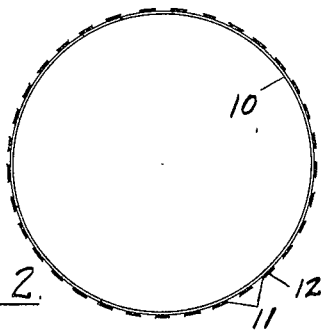
FIG. 2.
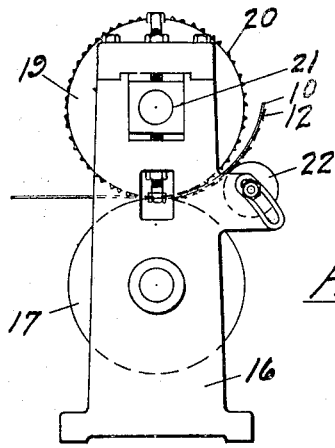
FIG. 6.
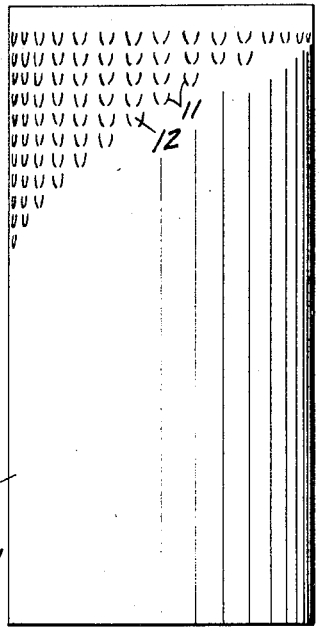
FIG. 1.
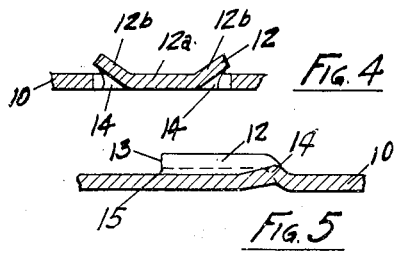
FIG. 4.
FIG. 5.
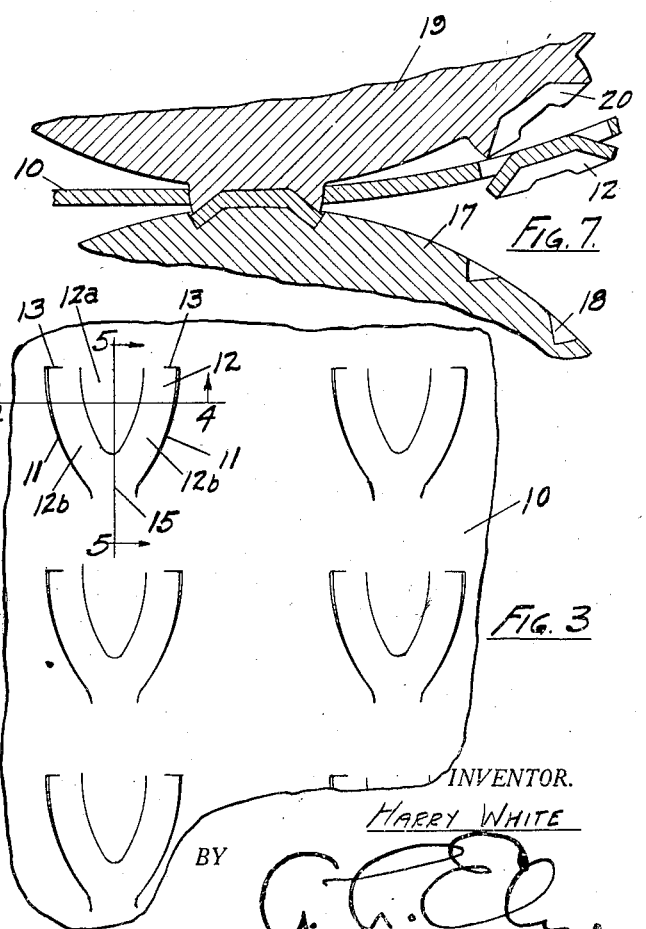
FIG. 7.
FIG. 3.
INVENTOR.
HARRY WHITE
BY
ATTORNEY Patented Jan. 5, 1932

1,839,284

UNITED STATES PATENT OFFICE

HARRY WHITE, OF KENMORE, OHIO

WELL SCREEN

Application filed September 4, 1926. Serial No. 133,695.

This invention relates to well screens.

The general objects of the invention are to provide an improved well screen of great strength to resist crushing and having determinate screening characteristics.

A specific object of the invention is to provide screen openings or slits arranged in pairs defined by a punched out shutter of metal of substantially triangular or heart shape which is connected at its top and bottom to the body of the metal, the narrow connection only, that is the one at the vertex of the shutter, having a reverse bend therein so that there is only one weak connection for each pair of slits provided, a connection which may be deformed more or less to provide wider or more narrow slits.

The foregoing and other objects of the invention are obtained by the constructions illustrated in the accompanying drawings and described below. It is to be understood that the invention is not limited to the specific forms thereof shown and described.

Of the accompanying drawings

Figure 1 is an elevation of a well screen embodying the invention;

Figure 2 is a plan thereof;

Figure 3 is an enlarged detail elevation thereof;

Figure 4 is a section on line 4—4 of Figure 3;

Figure 5 is a section on line 5—5 of Figure 3;

Figure 6 is an illustration of apparatus for performing the method to produce the well screen; and Figure 7 is a detail section thereof illustrating the punching operation.

Referring to the drawings, 10 indicates a well screen casing having vertical rows of slits 11, 11 arranged in pairs and defined by punched out shutters 12, substantially of triangular or heart shape. The pairs of slits 11 accordingly converge downwardly of the screen and have lateral inwardly extending portions 13, 13 at the top thereof defining lines along which the shutter 12 is bent outwardly as indicated at 14 so that the central section $12^a$ of shutter 12 lies in the surface of the casing, the marginal portion $12^b$ being bent outwardly.

The vertex of shutter 12 is connected to the casing by a comparatively narrow strip 15 capable of easy deformation to obtain wider or more narrow slits 11 during the manufacture of the screen as will be explained.

A well screen casing such as described above is especially resistant to clogging as it is introduced into a well through the usual gravel strata. The gravel which tends to wedge into ordinary screen openings tends to be swept away from said openings by rolling along the edges of the protecting shutters adjacent the vertices thereof where the shutter is connected to the body of the casing. The upward openings defined by slit extensions 13, 13 permit small gravel particles engaging in slits 11 to pass out of the slits at the tops of the shutters as the casing descends.

The above described screen may be made by a punching process. The preferred manner of performing this process and the preferred machine for use therein are shown in Figures 6 and 7. A rolling mill 16 is employed, this mill having a roller 17 formed with female dies 18 and a cooperating roller 19 formed with male dies 20, one of the rollers, such as 19, being journaled in adjustable bearings 21 so as to be adjustable toward and from the other roller 17 to vary the pressure therebetween and thus vary the width of the slits produced by the punching operation. The rolling mill 16 also carries a bending roller 22 by which the complete operation of punching and forming a sheet of metal to cylindrical shape is accomplished in the one device.

It will appear from the foregoing that an improved well screen and simple, inexpensive procedure and apparatus for making the same have been provided. It will also be apparent that modifications of the invention may be resorted to without departing from the spirit thereof or the scope of the appended claims.

What is claimed is:

1. A well screen including a casing and slits formed in the casing, said slits being arranged in pairs converging downwardly and having transverse inward extensions on their upper ends defining a triangular or heart-shaped shutter, the central portion of which is substantially in the surface of the casing and the marginal portion of which is bent outwardly, the vertex of the shutter being connected to the casing by a narrow strip capable of distortion during the manufacture of the casing to provide slits of determinate width.

2. A well screen including a casing and slits formed in the casing, said slits being arranged in pairs converging downwardly and defining a triangular or heart-shaped shutter, the central portion of which is substantially in the surface of the casing and the marginal portion of which is bent outwardly, the vertex of the shutter being connected to the casing by a narrow strip capable of distortion during the manufacture of the casing to provide slits of determinate width.

3. A well screen comprising a casing, and slits formed in the casing longitudinally thereof and defining shutters, said shutters being bent outwardly of the screen to provide screen openings, said slits having lateral extensions at the top thereof providing openings through which gravel tending to lodge in the slits as the casing descends into a well can pass from beneath the shutters.

HARRY WHITE.